(12) United States Patent
Jiang et al.

(10) Patent No.: US 7,424,494 B2
(45) Date of Patent: Sep. 9, 2008

(54) SYSTEM FOR SYNCHRONIZING VOICE MESSAGING SUBSCRIBER INFORMATION

(75) Inventors: Doreen D. Jiang, Andover, MA (US); Timothy R. Williams, North Andover, MA (US); Wei Shi, Brighton, MA (US); Ngonenokhame Inthasomsack, Andover, MA (US); Kay Lynn Watman, Londonderry, NH (US); Jianghong Zhou, Westford (CA); Edward J. Urban, Chelmsford, MA (US); Andrew J. Scharmer, Tewksbury, MA (US)

(73) Assignee: Comverse, Inc., Wakefield, MA (US)

( * ) Notice: Subject to any disclaimer, the term of this patent is extended or adjusted under 35 U.S.C. 154(b) by 248 days.

(21) Appl. No.: 09/934,582

(22) Filed: Aug. 23, 2001

(65) Prior Publication Data
US 2003/0059004 A1    Mar. 27, 2003

(51) Int. Cl.
*G06F 17/30* (2006.01)
(52) U.S. Cl. .............................. 707/203; 707/10; 707/3; 709/223; 709/224
(58) Field of Classification Search ................. 709/227, 709/213, 245, 223, 224; 707/104, 10, 201, 707/204, 3, 200, 203; 704/270; 379/88.25, 379/67.1, 112, 88.17, 88.01, 88.02, 88.04; 455/412.2, 413, 414.1; 370/352
See application file for complete search history.

(56) References Cited

U.S. PATENT DOCUMENTS

| | | | | |
|---|---|---|---|---|
| 5,657,376 A * | 8/1997 | Espeut et al. | ............ | 379/88.17 |
| 5,706,509 A * | 1/1998 | Man-Hak Tso | ............ | 707/201 |
| 5,913,032 A * | 6/1999 | Schwartz et al. | ............ | 709/213 |
| 5,928,329 A | 7/1999 | Clark et al. | ............ | 709/227 |
| 5,966,714 A * | 10/1999 | Huang et al. | ............ | 707/201 |
| 5,970,501 A | 10/1999 | Hunkins et al. | ............ | 707/200 |
| 6,047,046 A | 4/2000 | Smets et al. | ............ | 379/88.25 |
| 6,098,076 A | 8/2000 | Rekieta et al. | ............ | 707/202 |
| 6,141,663 A * | 10/2000 | Hunkins et al. | ............ | 707/201 |
| 6,173,439 B1 * | 1/2001 | Carlson et al. | ............ | 717/108 |
| 6,216,106 B1 * | 4/2001 | John | ............ | 704/270 |
| 6,226,358 B1 | 5/2001 | Schwartz et al. | ............ | 379/67.1 |
| 6,229,880 B1 * | 5/2001 | Reformato et al. | ............ | 379/88.01 |
| 6,230,164 B1 | 5/2001 | Rekieta et al. | ............ | 707/201 |
| 6,233,315 B1 * | 5/2001 | Reformato et al. | ............ | 379/88.01 |
| 6,233,318 B1 * | 5/2001 | Picard et al. | ............ | 379/88.17 |
| 6,240,391 B1 | 5/2001 | Ball et al. | ............ | 704/270 |
| 6,249,571 B1 | 6/2001 | Rojas | ............ | 379/112 |
| 6,498,791 B2 * | 12/2002 | Pickett et al. | ............ | 370/353 |
| 6,529,881 B2 * | 3/2003 | Morganstein et al. | ............ | 705/18 |
| 6,564,321 B2 * | 5/2003 | Bobo, II | ............ | 713/168 |
| 6,681,257 B1 * | 1/2004 | Patel et al. | ............ | 709/245 |
| 6,718,177 B1 * | 4/2004 | Comer et al. | ............ | 455/458 |

(Continued)

*Primary Examiner*—Jean M Corrielus
(74) *Attorney, Agent, or Firm*—Staas & Halsey LLP

(57) ABSTRACT

A system for automatically synchronizing a shared subscriber directory server with a voice messaging system. Update requests are generated for updating the shared subscriber directory server when a subscriber action or an administrative action updates subscriber information in the voice messaging system. The update requests are appended to a queue managed by an update server, and are handled by the update server in the same order as the corresponding actions that generated the requests. The update requests are read from the queue on a first-in first-out basis, are sent to the shared subscriber directory server, and are sent to the shared subscriber directory server where they are applied, thereby synchronously updating the subscriber directory server in real-time based.

23 Claims, 6 Drawing Sheets

U.S. PATENT DOCUMENTS

| | | | |
|---|---|---|---|
| 6,741,677 B2 * | 5/2004 | Reformato et al. | 379/88.01 |
| 6,882,708 B1 * | 4/2005 | Bedingfield et al. | 379/88.18 |
| 6,891,940 B1 * | 5/2005 | Bhandari et al. | 379/142.06 |
| 7,162,467 B2 * | 1/2007 | Eshleman et al. | 707/3 |
| 7,167,899 B2 * | 1/2007 | Lee et al. | 709/204 |
| 7,184,523 B2 * | 2/2007 | Dixit et al. | 379/88.17 |
| 2002/0069060 A1 * | 6/2002 | Cannava et al. | 704/257 |
| 2005/0076109 A1 * | 4/2005 | Mathew et al. | 709/223 |
| 2006/0209794 A1 * | 9/2006 | Bae et al. | 370/352 |

* cited by examiner

600

| LDAP Update Request Structure | |
|---|---|
| 602 | telephone |
| 604 | lata_id |
| 606 | routing_addr |
| 608 | presentation_addr |
| 610 | voice_encoding |
| 612 | fax_encoding |
| 614 | extended_absence_status |
| 616 | submailbox_count |
| 618 | submailbox_list |
| 620 | submailbox_status |
| 622 | name_announcement |
| 624 | name_changed |
| 626 | sender_anonymity_status |
| 628 | forwarding_type |
| 628 | forward_mbox |

Fig. 6

SYSTEM FOR SYNCHRONIZING VOICE MESSAGING SUBSCRIBER INFORMATION

BACKGROUND OF THE INVENTION

1. Field of the Invention

The present invention is directed to a system for synchronizing voice messaging subscriber information and, more particularly, is directed to a system for using an intermediary server to synchronously apply subscriber information updates from multiple voice messaging systems to a shared directory server, thereby providing a directory server that is synchronized in real-time with subscriber information in the different voice messaging systems.

2. Description of the Related Art

Different voice messaging systems are able to exchange subscriber messages. To send subscriber messages between subscribers of different voice messaging systems, voicemail systems need to obtain information about an external mailbox, such as a mailbox maintained by another vendor. Such information can include routing information, existence information, and availability information. Querying an external mailbox to determine whether an external mailbox exists, is available, or to obtain other information about the external mailbox requires the external mailbox's routing information. Routing information can be stored at and retrieved from the local voicemail system, or stored at and retrieved from a directory. If stored routing information is not available, the voice messaging system must query every possible destination voice messaging system to obtain the host address of an external message box. This approach is unreliable, inefficient, and may require support for different types of queries if voice messaging systems are from different vendors.

In the case where mailbox routing information is stored locally on a voicemail system, changes to external routing information must be manually applied to the corresponding routing information on the local voicemail system. These manual changes are problematic; voicemail systems may be from different incompatible vendors; changes must be distributed, which often is not possible; and the routing information must be changed manually, increasing the cost and the probability of error.

There are also problems in the case where mailbox routing information is stored at a shared central directory, or in the hybrid case where some mailbox feature information is stored locally, and mailbox routing information is stored at a shared central directory. The information stored at the shared central directory must be manually updated to reflect changes made to the voicemail systems, presenting similar compatibility and manual application problems. A need exists for automatically rather than manually updating information stored among voicemail systems.

The shared directory approach also creates synchronicity problems. Currently, subscriber updates made at voice messaging systems are manually tracked and applied to a central directory, usually by a systems administrator. When subscriber information changes at the subscriber's voice messaging system, that subscriber's information at the central directory must be updated as soon as possible or immediately after the change at the voice messaging system. If subscriber information changes at the subscriber's voice messaging system and does not change at the central directory, subscriber messages sent to the subscriber from different voice messaging systems will be routed based on out-of-date information stored at the central directory, and the messages will typically not be delivered. A need exists for rapidly synchronizing central database information with voicemail system information.

SUMMARY OF THE INVENTION

It is an aspect of the present invention to provide a system for automatically and synchronously updating subscriber information at a shared central directory when corresponding subscriber information is updated at a voice messaging system.

It is another aspect of the present invention to provide a system for updating a shared central directory, based on updates generated at the application level, without requiring a systems administrator to apply updates.

It is an aspect of the present invention to obviate the need for an administrator of the central directory to keep track of subscriber information changes on voice messaging systems and to update a shared directory database accordingly.

It is a further aspect of the present invention to provide a system for automatically updating a central directory that updates the central directory only when types of information stored at the central directory are updated at the voice messaging system.

It is another aspect of the present invention to provide a system for automatically updating a central directory when a subscriber to a voice messaging system updates their subscriber information.

It is another aspect of the present invention to provide a system for automatically updating a central directory that automatically updates the central directory when administrative actions update subscriber information.

It is another aspect of the present invention to provide a system for automatically updating a central directory that includes a bulk data update utility for updating large volumes of subscriber information at the central directory.

It is another aspect of the present invention to provide a system that is dynamic, reliable, fault tolerant, efficient, and updates a central directory in real-time.

It is another aspect of the present invention to provide an intermediate server used by each voice messaging system for accepting subscriber information updates, queuing updates, and for forwarding updates to a central directory server.

It is another aspect of the present invention to provide automatic real-time synchronization of subscriber information between voice messaging systems and a shared central directory. Synchronization is desirable because it prevents the loss or misdelivery of messages routed with information from the central directory, and reduces the administrative costs of voice messaging systems. The above aspects can be attained by a system that generates an update request in response to an event that changes subscriber information in a messaging system, and updating a shared subscriber directory based on the update request.

Therefore, the present invention performs these operations, for example by generating update requests for updating a shared subscriber directory server when one of subscriber actions and administrator actions update subscriber information in the voice messaging system, appending the update requests to a queue at an update server in a same order as corresponding one of subscriber actions and administrator actions occur, reading the update requests from the queue on a first-in first-out basis, sending the update requests to the shared subscriber directory server, and refreshing subscriber information in the update requests, after said reading and before said sending, in accordance with current corresponding subscriber information in the voice messaging system, when the update requests are one of expired and in a queue not primarily associated with the voice messaging system having the subscriber information.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 6 shows a data structure of an update request of the present invention.

DETAILED DESCRIPTION OF THE PREFERRED EMBODIMENTS

Figure 1:
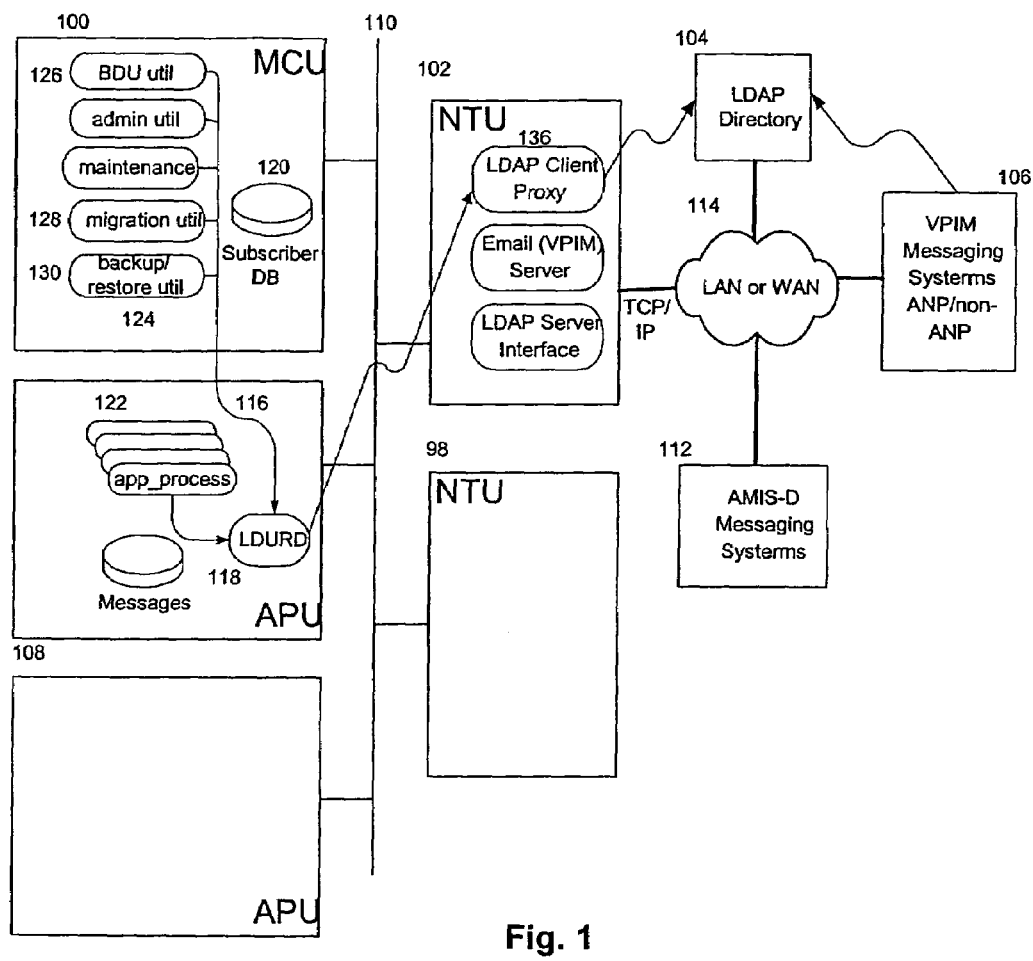
FIG. 1 shows an external directory shared by voice messaging systems including a voice messaging system implemented with an embodiment of the present invention.

Reference will now be made in detail to the preferred embodiments of the present invention, examples of which are illustrated in the accompanying drawings, wherein like reference numerals refer to the like elements throughout. The embodiments are described below to explain the present invention by referring to the FIGS. 1-6.

The present invention is designed to automatically update a centralized subscriber directory by generating a request for updating a central directory server, loading the request into a queue managed by the update server, forwarding the update to the central directory server, updating the central directory server with the update, and handling all related system errors and conditions. These operations will be described in more detail below.

FIG. 1 shows a Lightweight Directory Access Protocol (LDAP) directory 104 shared by voice messaging systems including a voice message system arranged to implement an embodiment of the present invention. Voice Messaging Systems (VMSs) are shown using a network (LAN or WAN) 114 to share the same central external directory 104 to obtain subscriber information typically used to enable the VMSs to exchange subscriber messages. A Voice Profile for Internet Mail (VPIM) 106 is also shown. The VPIM 106 is used for intersystem messaging. VPIM compliant messaging systems using a VPIM protocol, transfer voicemail messages as email to other VPIM compliant messaging systems. The Audio Messaging Interchange Specification (AMIS-D) messaging system 112 is another messaging system that may obtain subscriber information from a central directory 104. The Master Control Unit (MCU) 100 and Application Processing Unit (APU) 108 are components typically present in an embodiment of a VMS that makes use of the present invention. Such a VMS may also use AMIS-D to interchange messages, for instance with the AMIS-D messaging system 112.

The MCU 100 shown in FIG. 1 has a subscriber database 120 and utilities 124 for managing the subscriber database. A Bulk Data Upload utility (BDU) 126, administration utility, maintenance utility, migration utility 128, and backup/restore utility 130 are types of utilities typically used to administer the VMS subscriber database 120. These utilities 124 may be constructed or configured by one of ordinary skill in the art to send subscriber information to an LDAP Directory Update Request Daemon (LDURD) 118 over network 110, as shown by arrow 116 connecting these utilities 124 to the LDURD 118 in the Application Processing Unit (APU) 108.

The APU 108 in FIG. 1 hosts the LDURD 118, stores messages, and has application processes 122. When a subscriber uses a telephone to log into his or her mailbox and then changes a mailbox property, the voicemail application process 122 updates the subscriber information stored at the subscriber database 120, and triggers or sends a corresponding update request to the LDURD 118. The LDURD 118 collects update requests received from the voice messaging application processes 122 and from the MCU utilities 124, sends the requests to an LDAP Client Proxy (LCP) 136 over network 110, and waits for update results to be returned from the LCP 136.

The application processes 122 and administrative utilities 124 typically update subscriber information in the local subscriber database 120 when an administrator or subscriber, for example, creates a message box, deletes a message box, renames a message box, or moves a message box to another VMS. The application processes 120 and MCU utilities 124 can also update subscriber information, such as the subscriber name announcement, extended absence greeting status, message box forwarding type and number, message box capabilities (e.g. voice or fax), and support for sender anonymity. Other update events typically handled by the application processes 122 and utilities 124 might include; suspending a message box, reinstating a message box, restoring a message box from backup medium, changing a sub-message box, and changing the phone number associated with a message box. The present invention is not limited to these exemplary events and can handle other types of events affecting many types of mailbox attributes.

The NT-subsystem (NTU) 102 may be a server that hosts different services and is connected to network 110 and LAN/WAN 114. In this embodiment, the NTU 102 hosts an LCP 136. An LCP 136 serves as a go-between for the LDURD 118 and the shared LDAP directory 104. The LCP 136 may also perform other functions as discussed in detail below with reference to FIG. 5.

Figure 2:
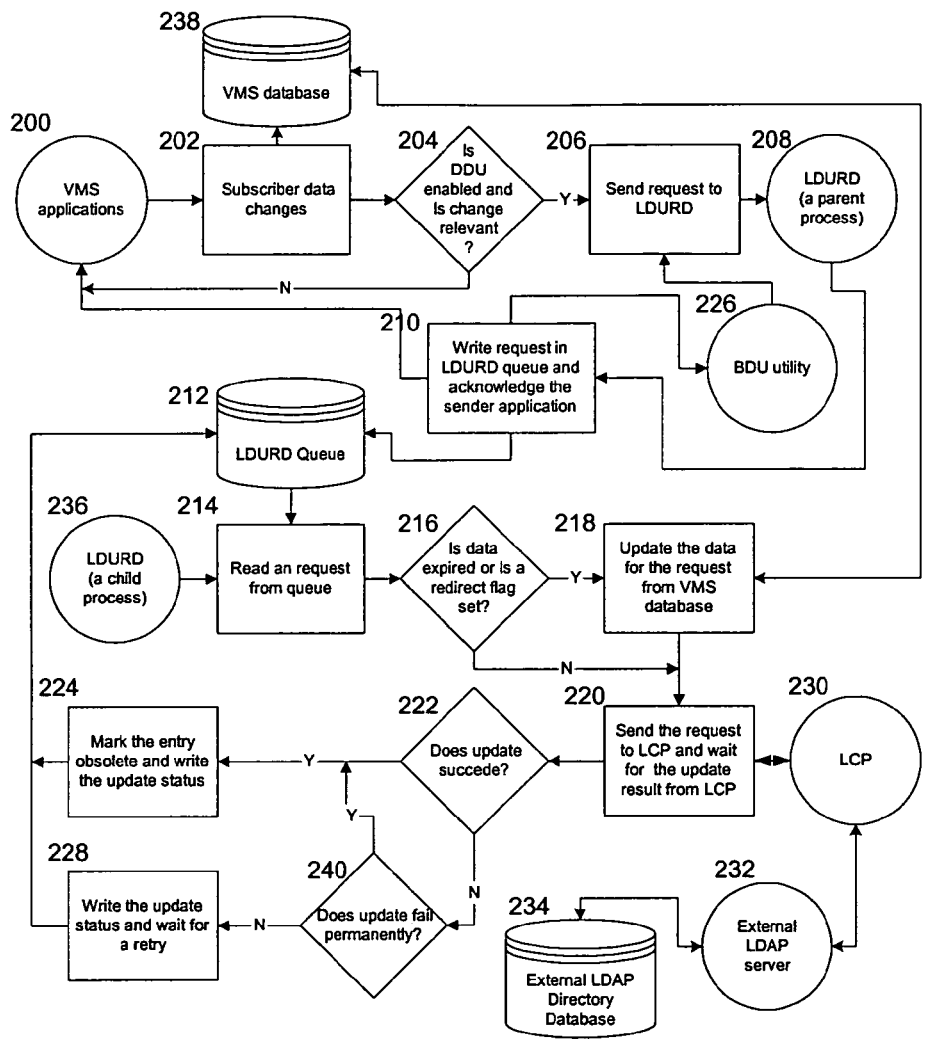
FIG. 2 illustrates the flow of a voice messaging update, starting from either a VMS application or a Bulk Data Upload utility, and flowing to a shared LDAP directory database.

FIG. 2 illustrates the flow of a voice messaging update, starting from either a VMS application 200 or a Bulk Data Upload utility 226, and flowing to a shared LDAP directory database 234. Dynamic Directory Updates (DDUs) are generated by VMS applications 200 when subscriber data changes 202 on a local VMS database 238, either by a subscriber or a VMS administrator. Upon completion of a message box change to the VMS database server 238, LDAP update trigger functions within an application 200 or BDU utility 226 may be called to update information in the shared LDAP directory 234.

The migration utility 128, shown in the MCU in FIG. 1, is an example of a utility used by a VMS administrator that generates an update request. The migration utility 128 migrates message boxes from a source VMS to a target VMS, and is preferably implemented to trigger a DDU request after a message box is successfully migrated. The migration utility 128, for example, may change a message box's location, routing address (the domain used for routing messages to the message box), and presentation address (the portion of the local subscriber's e-mail address that follows the "@" symbol). Other system dependent attributes may also be changed by the migration utility 128. For example, sender anonymity is a system-wide VMS configuration parameter that is also a subscriber attribute maintained in the shared LDAP directory 234. If a message box is migrated from a VMS that supports sender anonymity to another VMS that does not support sender anonymity, then the LDAP directory entry for the subscriber needs to be updated to reflect the change in support for sender anonymity.

Changing a name announcement is another event that can generate a DDU request. If it is determined that a name announcement is missing from the VMS subscriber database 238, a DDU request is submitted to remove the corresponding subscriber attributes from the shared LDAP directory 234. Or, if a newly created name announcement is too long, for example 40,960 bytes or 10 seconds (configurable on the LDAP server), the application that created the new name announcement triggers an update request to remove the name attributes from the corresponding entry in the shared LDAP directory 234. In this case, to ensure timely queries and transfers to the shared LDAP directory 234, the existing name announcement for that message box is deleted from the shared LDAP directory 234.

Another example of an event that can trigger generation of a DDU request is the restoration of a message box from a backup medium to a VMS not previously containing the message box. Such a restoration will generate a DDU request to the shared LDAP directory 234 to create a new entry. If the subscriber information of an existing message box is modified or overwritten by a restoration, then a DDU request is generated to modify the corresponding shared LDAP directory entry. If a collective message box (a message box that can have sub-message boxes) whose sub-message box count is greater than zero is restored while its sub-message boxes do not exist, then the sub-message boxes will be created and DDU requests will be generated to add the family table information to the shared LDAP directory 234. For example, assume 978/1001000 is the number of a collective message box whose sub-message box count is two. Assume also that the main message box is on a backup medium but the sub-message boxes are not on the backup medium. A restore utility 130 will check to see if the main message box already exists in the VMS, and if it does, the restore utility 130 will overwrite the main message box information and trigger a DDU request to modify the corresponding shared LDAP directory entry. If the main message box does not exist on the VMS, restoring it from backup medium will create the main message box and the two sub-message boxes on the VMS database 238. The restore utility 130 will trigger a DDU request to create entries in the shared LDAP directory 234 for 978/1001000 and its sub-message boxes, preferably after successful restoration is complete.

Another example of an event that can trigger generation of a DDU request is a change to the Class Of Service (COS) of a message box. COS is an attribute of a message box which is used to define a group of message box attributes. For example, on a VMS system, "COS 100" might define a group of message box attributes for a standard message box, and "COS 200" might define a attributes for a collective message box. Message boxes 978/1001001 through 978/100200 might be defined as collective message boxes using "COS 200". If an administrator changes 978/1001001's COS attribute from "COS 200" to "COS 100", the message box will be changed to a standard message box and its sub-message boxes will be removed from the VMS database 238. This change will trigger a DDU request to modify the LDAP entry for 978/100100 and to remove any entries related to its sub-message boxes. If the administrator does not change 978/1001000's COS number, but modifies the "COS 200" itself by changing the message box type from collective to standard, it will not trigger a DDU request. In this case, the BDU utility 226 can be used to update the external LDAP directory 234 because message boxes 978/1001001 through 978/1002000 have been changed, and the corresponding shared LDAP directory entries need to be updated.

Changes to COS, or changes to the addressing domain local access transport area ID (LATA ID), are preferably handled through the BDU utility 226, and preferably during off-peak hours, since many message boxes can be affected. The BDU utility 226 enables a VMS administrator to upload large amounts of subscriber information to the shared LDAP directory 104. In addition to updating message boxes in a given COS, the BDU utility 226 can update multiple ranges of message boxes or all the message boxes of a VMS. Because name announcement updates can generate significant network traffic, the BDU utility 226 may be provided with the option of not updating the name announcement.

Before triggering a DDU request, as in any of the update examples described above, a check 204 is performed to determine if DDU requests are enabled and if the change is relevant. If the DDU feature is not enabled then the trigger functions will not send 206 DDU requests to the LDURD 118. Furthermore, if a change is not relevant, the trigger functions will not send 206 DDU requests to the LDURD 118. Typically, subscriber information maintained locally by a VMS database 238 may contain attributes that are not mirrored at the shared LDAP directory 234. Therefore, to prevent unnecessary DDU requests, only changes to the values of attributes maintained at the external LDAP server 232,234 will trigger a DDU request. The attributes maintained at a shared LDAP directory 104 are usually described in a schema, which is used for determining whether any changes are relevant 204. Different implementations may use schemas having different sets of attributes, and schemas may be specific to a particular client.

If DDU requests are enabled and a requested change from a VMS application 200 or a BDU utility 226 is determined to be relevant, then an LDAP update request (e.g. BDU request or DDU request) is sent to the LDURD parent process 208. Preferably, the LDURD 118 runs on an APU 108 and is implemented as a parent process 208 with associated children processes 236. The LDURD 118 waits 404 for requests sent by an application that updates subscriber information pertaining to a message box in the VMS. The LDURD parent process 208 receives LDAP update requests, writes 210 the requests to a LDURD queue 212, and acknowledges the sender application. The child process 236 reads 214 request entries from the LDURD queue 212 on a first-in first-out basis. Furthermore, applications preferably send LDAP update requests having the same telephone number or message box number to the same LDURD on the same APU, and the LDURD 118 writes the requests to its queue in the order that they are received. The combined effect is that children processes 236 handle the LDAP update requests in an order equal to the order of the operations in the applications and utilities that triggered the LDAP update requests. This is significant because it ensures synchronization between the subscriber information on the VMS database 238 and the corresponding subscriber information maintained at the shared LDAP directory 234. For example, if an application generates an "add entry" LDAP update request, and then an application, perhaps a different application, generates a "delete entry" LDAP update request for the same VMS message box, those requests will be handled by the LDURD in the same order of the "add" and "delete" operations to the VMS database 238 by the applications that triggered the requests. How an application 200 or utility 226 supports LDAP update requests is described below with detailed reference to FIG. 3.

After reading 214 a request from the queue 212, the LDAP update request is checked 216 to see if its data is expired or if its redirect flag has been set. If either condition is true, then the LDURD will update 218 the data for the request from the VMS database 238. Otherwise, the LDAP update request is processed with the data as originally enqueued. The updated or original LDAP update request is then sent 220 to the LCP 230 (136) and the update result is waited for and received 220 from the LCP 230. The LCP 230 sends the request to an external LDAP server 232, which applies the request to the shared LDAP directory Database 234. When, after waiting 220, the update result is received from the LCP 230, the update result is checked 222 for success. If not successful then the update is tested 240 to determine if the update failed permanently. If it did not fail permanently, then the LDURD writes 228 the update status and waits for a retry. If the update succeeds or if the update fails permanently, then the LDURD will mark 224 the entry in the queue 212 as obsolete and will write the update status.

Typically, retries are performed at configurable intervals, are preferably limited to 12 attempts, with a maximum of twenty and a default of one. Other values can also be suitable. The time for data expiration of an LDAP update request can also be configurable.

Figure 3:
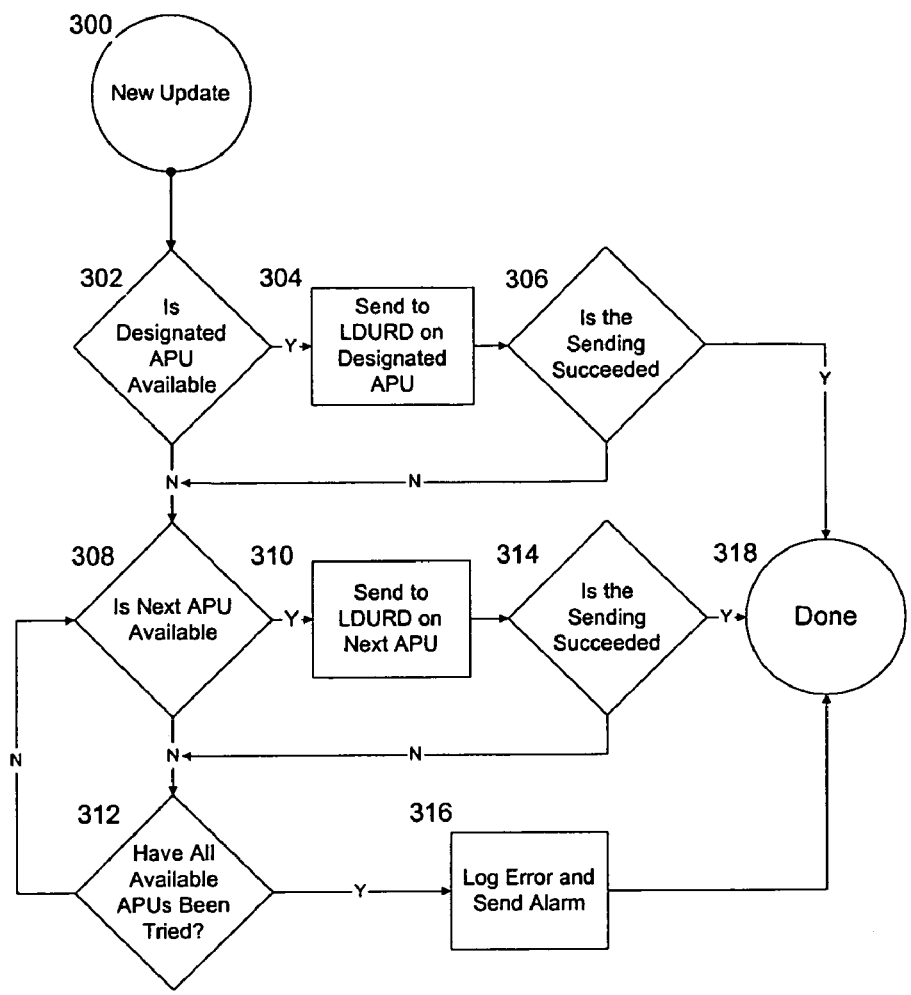
FIG. 3 shows the flow within an application that interacts with an intermediate middleware component LDURD server.

FIG. 3 shows the flow within an application interacting with an intermediate LDURD server. An application initially makes a new update 300 to a VMS message box. The application checks 302 if a designated APU is available. If the designated APU is available 302, then the application sends 304 the new update to the LDURD 118 on the designated APU 108, and if that send is successful 306 then the application is done 318. If the designated APU is not available 302, or if the send is not successful 304, then the application determines 308 if a next APU is available. If a next APU is available 308, then the application sends 310 the update to the LDURD 118 on that next APU 108. If the send to the next APU succeeds 314, then the application is done 318. If the send to the LDURD 118 on the next APU 108 does not succeed 314, or if a next APU is not available, then the application checks 312 if all available APUs have been tried. If they have not, then a next available APU is checked 308 for availability. If all available APUs have been tried 312, then the application logs 316 an error and sends an alarm, and is then done 318.

Applications and utilities are preferably designed to send LDAP update requests to the same LDURD on the same APU 108 based preferably on the phone number of the message box. The following formula may be used to select a designated APU: APU=(last three digits of the message box number MODULUS number of configured APUs)+1. This causes the LDAP update requests related to the same message box to generally be sent to the same designated APU's LDURD. This formula evenly distributes load across the available APUs. If a designated APU's LDURD does not accept the request, the application tries the LDURD on the next APU, and so forth. It is possible to use other algorithms and formulas; the present invention is not limited to the MODULUS formula above.

If an application redirects a request to an APU other than its designated APU, then the LDAP update request, submitted to the non-designated APU's LDURD, is flagged as having been redirected. As a result, when an LDURD child process 236 reads the redirected LDAP update request from its LDURD queue 212, and checks 216 whether the data is expired or redirected, the child will update the data in the request from the VMS database 238, thereby refreshing the LDAP update request before sending 220 the LDAP update request to the external directory server 232 via the LCP 230. Refreshing redirected LDAP update requests ensures that the subscriber information to be updated by the LDAP update request is current. Refreshing redirected LDAP update requests also ensures that their updates are performed correctly, even though the order in which the non-designated LDURD handles a redirected LDAP update request—relative to other LDAP update requests affecting the same message box—may have been altered by its redirection from the LDURD designated by the message box's phone number.

Figure 4:
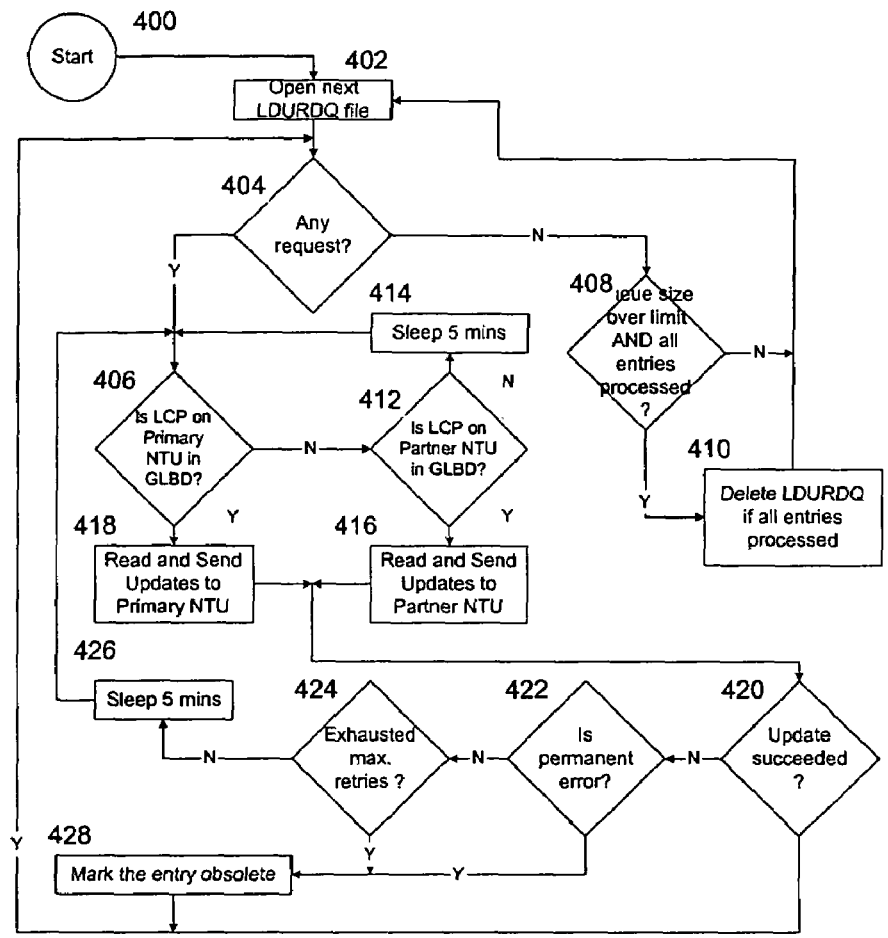
FIG. 4 shows the flow within an intermediate LDURD server.

FIG. 4 shows the flow within an intermediate LDURD server. The LDURD is a stand-alone program that may run on each APU 108 of a VMS, thereby avoiding a single failure point or performance bottleneck. All LDAP update requests are first sent from applications or utilities to the LDURD 118, which then forwards the LDAP update requests to the shared LDAP directory 104, preferably via LCPs 136. The LDURD 118 has the advantage that it maintains consistency between the subscriber database 120 on the VMS and the shared LDAP directory 104 by always sending up-to-date subscriber information to the LDAP directory 104. Front-end applications, by letting the LDURD 118 handle LDAP update requests to the shared LDAP directory 104, avoid the delay of waiting for final update results from the external LDAP server; an application may immediately return control to a user after a request is received by the LDURD. Furthermore, by using a stand-alone LDURD 118, applications do not have to maintain their own queues of LDAP update requests to update the shared LDAP directory 104, thereby reducing the complexity of those applications. Preferably, applications and utilities that access the LDURD 118 are constructed using LDURD functions in a common shared library.

LDAP update requests in the LDURD Queue (LDURDQ) 212 contain metadata and the values of the LDAP attributes for a given message box or phone number. The metadata may include: a time stamp indicating when the request was received by the LDURD; a message box number or phone number; the type of command or update to be performed; a flag indicating if the name announcement is to be transferred to the shared LDAP directory 104; a retry count; a redirect flag indicating whether the current APU hosting the LDURD is the APU designated for the LDAP update request; an obsolete flag indicating whether the request is valid; and an update status of the LDAP update request, for example success, postponed, or permanent error.

The LDURD 118 starts 400 (see FIG. 4) when call processing for a VMS starts. The LDURD 118 opens 402 the next LDURDQ file on the same APU 108 as the LDURD 118. The LDURDQ 212 is used as a first-in first-out queue (FIFO), possibly implemented as a binary disk file or series of binary files, with new LDAP update requests appended to the end of a binary file. If there are no requests in the LDURDQ file, the LDURD 118 will check 408 if the queue size is over a configurable limit and if all entries are processed. If so, the LDURD 118 will delete 410 the LDURDQ file, and then will open 402 the next LDURDQ file. If the queue size is not over the limit or all entries are not processed 408, then the LDURD 118 will sleep 1 minute and then check 404 if there is any request.

If a request is in 404 the LDURDQ 212, then the LDURD 118 will check 406 whether the LCP 136 is available on the LDURD's 118 designated primary NTU 102 that is listed in a Global Location Broker (GLBD). The designated primary NTU 102 is based on the formula: NTU=(last three digits of mailbox number % number of available LCPs) +1. Other algorithms are possible. Accordingly, update requests associated with the same mailbox number go to the same NTU. However, if the designated LCP 136 is not available, then the LDURD 118 will check if the LCP 136 is on a partner NTU 98 that is paired with the primary NTU 102 and is also listed in the GLBD. If the LCP 136 is not on either the designated primary NTU 102 or the partner NTU 98, then the LDURD 118 will sleep 414 for preferably 5 minutes, and then proceed to check 406 again for the LCP 136 on the primary NTU 102. If the LCP 136 is on the primary NTU 102, the LDURD 118 will read and send 418 updates to the primary NTU 102. If the LCP 136 is 412 on the partner NTU 98, then the LDURD 118 will read and send 416 updates to the partner NTU 98.

As discussed above with reference to FIG. 2, before the LDURD 118 sends a request to the LCP 136 on either the primary NTU 102 or partner NTU 98, it compares the request's timestamp to an entry expiration parameter to determine if the subscriber information for that request has expired and needs to be updated. If the request has expired, the LDURD 118 accesses the local subscriber database 120 on the database server to reload current data for the request. If a request is no longer valid, for instance if the corresponding message box has been deleted, then the LDURD 118 will mark as obsolete the request in the LDURDQ.

To prevent delays or deadlocks when sending an update to either the primary 102 or partner NTU 98, the LDURD 118 may set up a timeout alarm that runs while the LDURD 118 is waiting for the update result from the LCP 136. The LDURD 118 checks 420 if the update succeeded. If the update succeeded, the LDURD 118 returns to waiting 404 for a request. If the update did not succeed, the LDURD 118 checks 422 if the error is a permanent error. If the error is permanent error, the LDURD 118 marks 428 the entry obsolete and returns to waiting 404 for a request. If the error is not a permanent error the LDURD 118 checks 424 the retry count of the request to determine if the maximum retries for the request have been exhausted. If they have been exhausted, the LDURD 118 marks 428 the entry obsolete and returns to waiting 404 for a request. If the retries have not been exhausted, the LDURD 118 sleeps 426 for preferably 5 minutes (as defined by a configurable retry parameter) and proceeds to retry the request by checking 406 whether the LCP 136 is on the primary NTU 102.

An optional flat configuration file can be used to define LDURD configuration parameters, such as entry expiration, update timeout, retry interval, and maximum number of retries. The configuration file may be read when the LDURD starts 400 and the configuration parameters may be set accordingly. The LDURD may also re-read the configuration file at pre-defined intervals or upon an administrator's command. If the configuration file does not exist or is not used, then the LDURD assigns pre-defined values to the configuration parameters.

By implementing the LDURDQ as a binary disk file, the LDURD 118 may take advantage of APU disk failover support typically found in VMS systems. Disk failover involves switching from a failed disk group to a redundant backup disk group. If failover occurs, the change of the disk group status is detected and the disks of the failed subsystem are mounted on a partner APU. The LDURD parent process on the survivor APU spawns a new LDURD process to handle the LDURDQ on the mounted remote disks. When all remote requests have been handled, or when the failed APU recovers, the LDURD process for the remote LDURDQ exits or is terminated.

The LDURD 118 can use User Datagram Protocol (UDP) functions, typically found in UNIX libraries, to prepare UDP transmission packets and to send UDP packets to the LCP 136. The UDP packets include a message box number and any other information that the LCP 136 needs to update the external directory. Trigger functions, used by the applications and utilities and preferably encapsulated in a shared library, determine the designated LDURD, prepare the UDP packets, and send them to the LDURD 118 with the metadata and the attribute data of the message box number. The LDURD determines the proper NTU hosting the LCP to receive the LDURD's updates.

Figure 5:
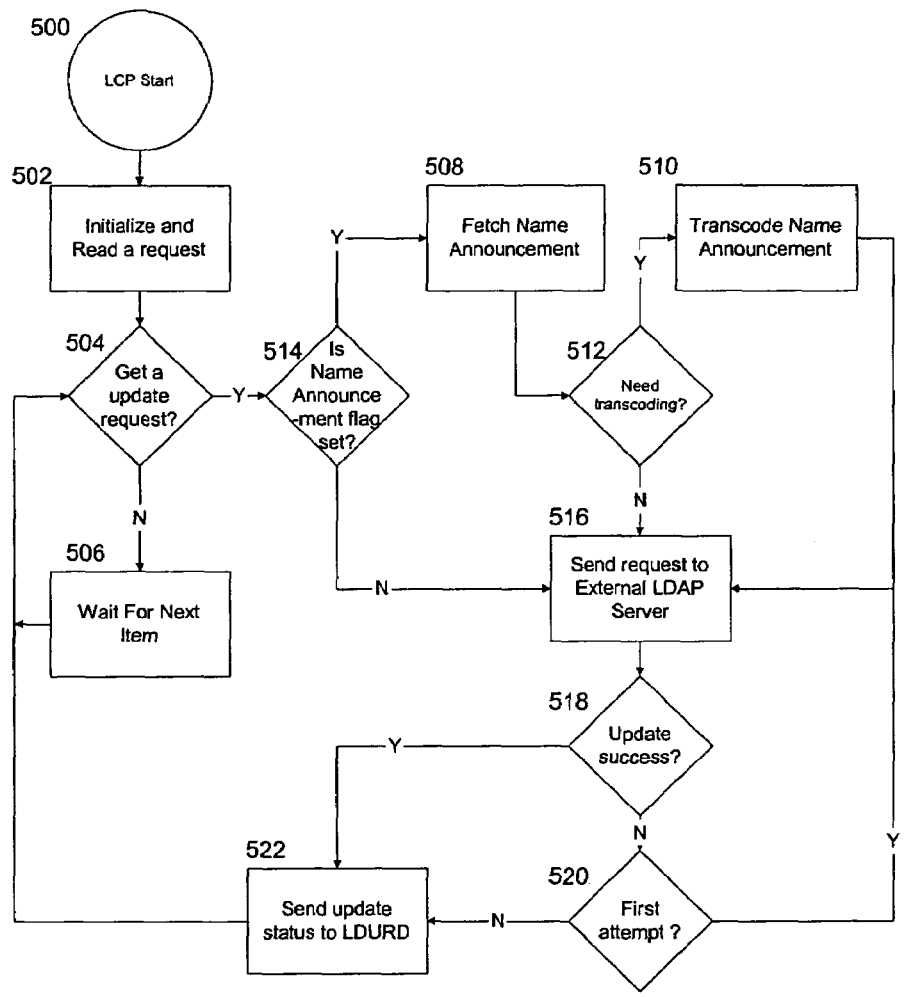
FIG. 5 shows the flow of a proxy client reading requests from the intermediate LDURD server, processing the requests, and forwarding the requests to the shared LDAP server.

FIG. 5 shows the flow of a proxy client reading requests from an intermediate server, processing the requests, and forwarding the requests to the external LDAP server. An LCP starts 500, and initializes and waits 502 to read a request from the LDURD 118. After the LCP 136 receives 504 an update request from the LDURD 118, the LCP 136 examines the update request, reformats the request, and prepares to send the request to the external directory. The LCP 136 then checks 514 if a name announcement update flag is set. If the name announcement flag is set, the LCP 136 fetches 508 the name announcement from the APU 108. The LCP 136 then checks 512 to see if the name announcement needs transcoding. If it does, then it transcodes 510 the fetched name announcement. After any name announcement processing is complete, the LCP 136 sends 516 the request to an external LDAP server. If the update is successful 518, then the LCP 136 sends 522 an appropriate update status to the LDURD 118. If the update is not successful, then the LCP 136 determines 520 whether it is the first attempt. If it is the first attempt, then it again sends 516 the request to the external LDAP server. If the update is not successful 518 and it is not the first attempt 520, then the LCP 136 sends 522 an update status to the LDURD 118. After finishing processing a request by sending 522 the update status to the LDURD 118, the LCP 136 proceeds to again wait 504 for an update request 504.

FIG. 6 shows a data structure 600 of an update request of the present invention. The data structure 600 of the LDAP update request is the core part of an LDAP update request. It includes LDAP attributes for a message box or phone number based on a given LDAP schema. Mailbox attributes stored on the LDAP server are defined in the data structure 600, and new attributes would be added to this data structure 600, as needed. The data structure 600 is used by the applications and utilities to send requests to the LDURD, and by the LDURD to send requests to the LCP. The structure 600 includes fields for; telephone number 602 of the message box, local access transport area identifier 604, routing address 606 of the message box, presentation address 608, which is the address of the system hosting the message box, voice encoding 610 for indicating the type of compression used in the message box, fax encoding 612 indicating the type of fax encoding used in the message box, extended absence status 614 indicating extended absence of the message box owner, submailbox count 616 indicating the number of sub-mailboxes, submailbox list 618 listing the submailboxes, submailbox status 620, name announcement 622, name changed 624, sender anonymity status 626, forwarding type 628, and forward mbox 630 which is the mail box to which messages are forwarded. The data structure 600 is typically defined as follows:

```
typedef struct ldap_update_request {
    ldap_telephone_t        telephone;
    ldap_lata_id_t          lata_id;/* local access transport area id */
    ldap_telephone_t        routing_addr; /* an IP address */
    ldap_telephone_t        presentation_addr; /* a host name */
    int                     voice_encoding;
    int                     fax_encoding;
    char                    extended_absence_status; /* true/false */
    unsigned short          submailbox_count;
    char                    submailbox_list[MAX_FAMILY_MEMBERS];
    char                    submailbox_status; /* true/false */
    poentry_t               name_announcement;
    char                    name_changed; /* true/false */
    ldap_sender_anonymity_t sender_anonymity_status;
    ldap_forwarding_type_t  forwarding_type;
    ldap_telephone_t        forward_mbox;
} ldap_update_request_t;
```

The LDURD package having the data structure set forth below is used by applications and utilities to communicate with the LDURD. The application fills in the attribute data in the Idap_ldurd_request_t structure, sends the request to the LDURD, and then waits for a response from the LDURD. The LDURD uses the same structure to respond to the application's request. The LDURD puts an "ACK" or a "NACK" in the ldap_ldurd_response_t field to indicate whether the request is received successfully, as shown in the data structure detailed below:

```
typedef struct ldap_ldurd_request {
    ldap_ldurd_req_info_t   info;
    ldap_update_request_t   data;
} ldap_ldurd_request_t;
```

The following srtucture is the metadata structure. It is created for LDURD to keep track of an update request entry in the LDURD queue:

```
typedef struct ldap_ldurd_req_info {
    ushort                  magic;
    word                    version;
    time_t                  time_stamp;   /* when the request is generated */
    ldap_operation_type_t   op_type;      /* operation type */
    ldap_entry_type_t       entry_type;   /* entry type */
    mbox_t                  mbox;         /* mailbox number */
    int                     sub;          /* submailbox number */
    mbox_t                  phone;        /* phone list number */
    word                    flags;        /* flags defined below */
    word                    cos;          /* COS of the mailbox */
    int                     attempt_cnt;  /* attempted tries */
    ldap_status_t           status;       /* return status */
} ldap_ldurd_req_info_t;
```

```
typedef struct ldurd_pkt {
    ldurd_subcmd_t      subcmd;             /* sub command */
    union {
        ldap_ldurd_request_t    ldap_ldurd_req;  /* request  */
        ldap_ldurd_response_t   ldap_ldurd_rsp;  /* response */
    } var;
} ldurd_pkt_t;
typedef enum {
    LDAP_LDURD_RSP_ACK,
    LDAP_LDURD_RSP_NACK
} ldap_ldurd_response_t;
```

In the LDURD queue file, each entry represents an update request. The Data Structure of an LDURD Request contains the metadata that is defined in ldap_Idurd_req_info_t, and the values of the LDAP attributes for a given mailbox or phone number that are defined in Idap_update_request_t data structure set forth below:

The data structure of the LDAP Update Request UDP Packet is a union member of ldap_ripc_request. The ldap_ripc_request data structure, as set forth below, is used for transferring the update request from the LDURD to the LCP:

```
typedef struct ldap_rlpc_request {
    ldapr_subcommand_t subcommand;
    long            sequence;     /* Unique number per query */
    unsigned int    expiration;   /* Query timeout in seconds */
    union {
        ...
        ldap_update_request_t;
    } var;
} ldapr_request_t;
```

The present invention has been described with respect to "voice messaging systems" (VMSs). "Voice messaging system" is used in the present application to refer more generally to messaging systems that are capable of handling non-voice messages, such as text, video, e-mail, etc.

The present invention has also been described with respect to a proxy client (LCP) to facilitate communication between an LDURD and a shared subscriber directory. However, another embodiment of the present invention may forego the LCP and place the functionality of the LCP in for example the LDURD. Furthermore, a shared directory may be implemented without using the Lightweight Directory Access Protocol (LDAP). Although the present invention has been described with respect to the use of UDP packets for communicating between the LDURD and LCP, other protocols may also be used, for example TCP. An APU was designated to a message box based on the phone number associated with message box and the number of APUs. However, any designation scheme will suffice if it evenly distributes message boxes to APUs and also directs updates for a message box to always go first to the same APU. The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method for automatically updating a shared central subscriber directory used over a network by different autonomous telephony voice messaging systems to route subscriber messages, comprising:
   generating an update request in response to an event that changes voice messaging subscriber information in a subscriber database of a voice messaging system based on a determination that said event is one of predetermined events requiring an update across the telephony messaging systems;
   appending the update request generated to a queue and reading each update request from the queue on a first-in first-out basis; and
   automatically updating the shared central subscriber directory including corresponding voice messaging subscriber information based on the update request, where the updated shared central subscriber directory is used by the different autonomous telephony messaging systems to route subscriber voice messages, wherein the telephony voice messages systems are maintained by multiple vendors.

2. A method as recited in claim 1, further comprising storing the update event at an intermediate server while maintaining synchronicity between the update event and the messaging system.

3. A method as recited in claim 1, wherein said generating occurs only when information changed in a message box has corresponding information in the shared central subscriber directory.

4. A method as recited in claim 3, further comprising sending the update request from the intermediate server to a proxy client that in turn sends the update request to the shared central subscriber directory.

5. A method as recited in claim 1, wherein said generating and updating is performed by a plurality of messaging systems that also access the shared central subscriber directory.

6. A method as recited in claim 1, wherein said generating is responsive to a change to a message box initiated by a subscriber telephone call.

7. A method for automatically updating a shared central subscriber directory server used over a network by different autonomous telephony voice messaging systems to route voice subscriber messages, comprising:
   generating an update request for updating the shared subscriber directory server when one of subscriber actions and administrator actions update voice messaging subscriber information in a database of one of the voice messaging systems, said generating being based on a determination that one of the subscriber actions and the administrator actions matches predetermined events requiring an update across the voice messaging systems, wherein one of subscriber actions and administrator actions comprises one of creating a message box, deleting a message box, modifying a message box, suspending a message box, reinstating a message box, reinitializing a message box, and migrating a message box from a first voice messaging system to a second voice messaging system;
   appending, when the update request is generated, the update request to a queue managed by an update server and in a same order as one of corresponding subscriber actions and corresponding administrator actions occur;
   reading the update requests from the queue on a first-in first-out basis;
   sending the update requests to the shared subscriber directory server using one of Lightweight Directory Access Protocol and X.500 protocol;
   refreshing subscriber information in the update requests, after said reading and before said sending, in accordance with current corresponding subscriber information in the voice messaging system, when the update requests are one of expired and in a queue not primarily associated with the voice messaging system having the subscriber information; and
   automatically updating the shared subscriber directory server in real-time based on the update request whereby an updated shared central subscriber directory of said server is used by the different autonomous telephony voice messaging systems to route voice subscriber messages, wherein the telephony voice messages systems are maintained by multiple vendors.

8. A method as recited in claim 7, wherein said appending, reading, sending and refreshing are performed by an intermediate server managing the queue, and said generating occurs at one of an application process, an administrative utility, and a bulk data upload utility.

9. The method as recited in claim 8, wherein the bulk data upload utility generates update requests for one of ranges of message boxes in the voice messaging system, all message boxes in the voice messaging system, and ranges of message boxes in the voice messaging system.

10. A method as recited in claim 7, wherein the subscriber directory resides in a remote, foreign addressing domain and is shared by messaging systems from different vendors.

11. A method as recited in claim 7, further comprising appending the update request to a queue of a secondary update server when a primary update server is unavailable.

12. A method as recited in claim 7, further comprising reading from a second update server the update requests in the queue responsive to a failure impairing the update server.

13. A method as recited in claim 7, wherein the subscriber action comprises a telephone call that updates the message box of the subscriber.

14. A method as recited in claim 7, wherein said generating is triggered in an application corresponding to one of the subscriber action and the administrator action.

15. A method as recited in claim 14, wherein the application corresponding to one of the subscriber action and the administrator action resumes processing immediately after said generating.

16. A method as recited in claim 7, wherein said generating is responsive to a change to a message box initiated by a subscriber telephone call.

17. A method as recited in claim 7, further comprising determining whether name announcements are attributes of subscriber information that are updated on the shared directory server.

18. A method as recited in claim 17, further comprising including name announcement data with the update requests if said determining indicates that name announcement data is updated on the shared directory server, and transcoding the name announcement before sending said announcement data to the shared subscriber directory server.

19. A method for automatically updating a shared subscriber directory used by different autonomous telephony voice messaging systems to route voice subscriber messaging, comprising:

generating, responsive to a subscriber telephone call, an update request for updating the shared subscriber directory server when one of subscriber actions and administrator actions update voice messaging subscriber information in the voice messaging system, said generating being based on a determination that one of the subscriber actions and the administrator actions matches predetermined events requiring an update across the voice messaging system, wherein one of subscriber actions and administrator actions comprises one of creating a message box, deleting a message box, modifying a message box, suspending a message box, reinstating a message box, reinitializing a message box, and migrating a message box from a first voice messaging system to a second voice messaging system;

appending, the update request to a queue managed by an update server and in a same order as one of corresponding subscriber actions and corresponding administrator actions occur;

reading, with the update server, the update requests from the queue on a first-in first-out basis;

sending the update requests from the update server to the shared subscriber directory server using Lightweight Directory Access Protocol;

refreshing, with the update server, voice messaging subscriber information in the update requests, after said reading and before said sending, in accordance with current corresponding voice messaging subscriber information in the voice messaging system, when the update requests are one of expired and in a queue not primarily associated with the voice messaging system having the voice messaging subscriber information; and automatically updating the shared subscriber directory server in real-time based on the update request and using an updated shared central subscriber directory of said server to route voice subscriber messages, wherein the telephony voice messages systems are maintained by multiple vendors.

20. An apparatus for automatically updating a central subscriber directory used over a network by different autonomous telephony voice messaging systems to route subscriber messages, comprising:

a processor generating an update request in response to an event that changes voice messaging subscriber information in a subscriber database of one of the voice messaging systems, the update request being generated based on a determination that the event is one of predetermined events requiring an update across the telephony voice messaging systems; and a database comprising the central subscriber directory having the voice messaging subscriber information, where the central subscriber directory is automatically updated by appending the update request generated to a queue and reading each update request from the queue on a first-in first-out basis, whereby the changed voice messaging subscriber information of the central subscriber directory is used by different autonomous telephony voice messaging systems to route subscriber voice messages, wherein the telephony voice messages systems are maintained by multiple vendors.

21. An apparatus for automatically updating a shared subscriber directory server used over a network by different autonomous telephony voice messaging systems to route subscriber voice messages, comprising:

a processor generating an update request for updating the shared subscriber directory server when one of subscriber actions and administrator actions update voice messaging subscriber information in the voice messaging system, where the update request is sent when generated and is based on a determination that one of the subscriber actions and the administrator actions matches predetermined events requiring an update across the telephony voice messaging systems, wherein one of subscriber actions and administrator actions comprises one of creating a message box, deleting a message box, modifying a message box, suspending a message box, reinstating a message box, reinitializing a message box, and migrating a message box from a first voice messaging system to a second voice messaging system;

an update server receiving the update request and appending the update request to a queue managed by said update server in a same order as one of corresponding subscriber actions and corresponding administrator actions occur, said update server reading the update requests from the queue on a first-in first-out basis and sending the update requests to the shared subscriber directory server; and a shared subscriber directory server automatically updating a voice messaging subscriber database in real-time based on the update request, whereby the updated voice messaging subscriber information of said shared subscriber directory server is used by different autonomous telephony voice messaging systems to route subscriber voice messages, wherein the telephony voice messages systems are maintained by multiple vendors.

22. A computer readable storage medium having instructions stored therein for automatically updating a voice messaging subscriber directory used to route subscriber messages across different autonomous telephone voice messaging systems, comprising:

generating an update request responsive to a voice messaging subscriber information change event in any of plural voice messaging subscriber information databases of respective autonomous voice messaging systems in response to a determination that said event is one of predetermined events requiring an update across the voice messaging systems;

appending the update request generated to a queue and reading each update request from the queue on a first-in first-out basis; and automatically updating a shared centralized subscriber directory including corresponding voice messaging subscriber information based on the update request and using the updated shared centralized subscriber directory to route subscriber voice messages from different autonomous telephone voice messaging systems to exchange messages, wherein the telephony voice messages systems are maintained by multiple vendors.

23. A method of automatically updating a shared directory used by different autonomous telephony voice messaging systems to route voice messages, comprising:

receiving a request for changing voice messaging subscriber information from a corresponding subscriber, said voice messaging subscriber information being stored in a shared directory used by different autonomous telephony messaging systems;

appending the update request generated to a queue and reading each update request from the queue on a first-in-first-out basis; and automatically updating the shared directory including the voice messaging subscriber information across each of the telephony messaging systems based on the request, wherein the updated shared central subscriber directory is used by different autonomous telephony messaging systems to route subscriber voice messages, wherein the telephony voice messages systems are maintained by multiple vendors.

* * * * *

UNITED STATES PATENT AND TRADEMARK OFFICE
CERTIFICATE OF CORRECTION

| | | |
|---|---|---|
| PATENT NO. | : 7,424,494 B2 | |
| APPLICATION NO. | : 09/934582 | |
| DATED | : September 9, 2008 | |
| INVENTOR(S) | : Doreen Jiang et al. | |

It is certified that error appears in the above-identified patent and that said Letters Patent is hereby corrected as shown below:

Title Page, Column 1 (Inventors), Line 7, after "Westford" change "(CA);" to --(MA);--.

Column 15, Lines 23-24, change "messaging," to --messages,--.

Column 16, Line 57, change "telephone" to --telephony--.

Column 17, Line 9, change "telephone" to --telephony--.

Column 18, Lines 5-6, change "first-in-first-out" to --first-in first-out--.

Signed and Sealed this

Third Day of March, 2009

JOHN DOLL
*Acting Director of the United States Patent and Trademark Office*